United States Patent

[11] 3,532,166

| [72] | Inventor | Sherrod A. Williams<br>Dallas, Texas |
|---|---|---|
| [21] | Appl. No. | 790,453 |
| [22] | Filed | Jan. 10, 1969 |
| [45] | Patented | Oct. 6, 1970 |
| [73] | Assignee | Mobil Oil Corporation<br>a corporation of New York |

[54] OIL RECOVERY PROCESS USING THICKENED AQUEOUS FLOODING LIQUIDS
11 Claims, No Drawings

[52] U.S. Cl. .................................................. 166/274,
166/275, 252/8.55
[51] Int. Cl. ................................................ E21b 43/22
[50] Field of Search .......................................... 166/274,
275, 268, 305; 252/8.55(D)

[56] References Cited
UNITED STATES PATENTS

| 3,042,611 | 7/1962 | Patton | 166/275 |
| 3,087,539 | 4/1963 | Maurer | 166/274 |
| 3,208,518 | 9/1965 | Patton | 166/246 |
| 3,302,713 | 2/1967 | Ahearn et al. | 166/275X |
| 3,305,016 | 2/1967 | Lindblom et al. | 166/246 |
| 3,319,715 | 5/1967 | Parks | 166/283 |
| 3,369,602 | 2/1968 | Fallgatter et al. | 166/273 |
| 3,370,649 | 2/1968 | Wolgemuth | 166/274 |
| 3,372,749 | 3/1968 | Williams | 166/274 |
| 3,373,810 | 3/1968 | Williams | 166/246 |
| 3,478,823 | 11/1969 | Murphy | 166/274 |

*Primary Examiner*—Stephen J. Novosad
*Attorneys*—William J. Scherback, Frederick E. Dumoulin, Drude Faulconer, Andrew L. Gaboriault and Sidney A. Johnson

ABSTRACT: This specification discloses a process for recovering oil from a subterranean reservoir which process utilizes a thickened flooding liquid containing an ionic polysaccharide, preferably polysaccharide B-1459. In the process, a sacrificial agent is injected into the reservoir to cover substantially all of the adsorption sites within the reservoir to prevent substantially the ionic polysaccharide from absorbing out of the flooding liquid. The sacrificial agent comprises a water-soluble carbonate and/or a water-soluble, inorganic polyphosphate and can be injected prior to the flooding liquid and/or contained therein.

3,532,166

OIL RECOVERY PROCESS USING THICKENED AQUEOUS FLOODING LIQUIDS

BACKGROUND OF THE INVENTION

The present invention relates to the recovery of oil from subterranean reservoirs and more particularly relates to a process of improving the sweep efficiency of a waterflood, oil recovery operation.

The use of a "waterflood" operation to recover oil from subterranean reservoirs is well known in the petroleum production art. A typical waterflood involves injecting an aqueous flooding liquid, e.g., water, into a reservoir to drive oil through the reservoir toward one or more production wells from which it can be produced to the surface. Unfortunately, the injected water has a tendency to channel through certain portions of the reservoir while completely bypassing others. This inability of the water to "sweep" substantial areas within the reservoir seriously affects the ultimate recovery of oil and detracts from the economical attractiveness of such operations. Accordingly, the need to improve the sweep efficiency of waterfloods has long been apparent.

Early research revealed that poor sweep efficiency can be attributed to several factors. One is the natural tendency of a liquid to flow in the path of least resistance; hence, the water flows through the highly permeable portions of the reservoir more readily than through the less permeable portions. Another factor involves the differences between the mobilities of the injected water and the oil in the reservoir. In both instances, the sweep efficiency of a waterflood can be improved by increasing the viscosity of the injected water.

Past techniques for increasing the viscosity of flood water have included incorporating water-soluble thickening additives into the water. Additives that have been suggested for this purpose include a wide variety of naturally occurring gums, sugars, and polymers. One of the most promising groups of such thickeners is the ionic polysaccharides, particularly the polysaccharide prepared by employing bacteria of the genus *Xanthomonas* and commonly referred to as polysaccharide B-1459.

Water thickened with polysaccharide B-1459 exhibits properties desirable for increased sweep efficiency but, unfortunately, it has now been found that polysaccharide B-1459 has a tendency to absorb out of the flood water onto active adsorption sites, i.e., rock surfaces, within the reservoir almost as soon as the thickened water is injected therein. As the thickened water flows outward from an injection well, more and more of the ionic polysaccharide is adsorbed, and after only short penetration into the reservoir, the water has lost much of its viscosity and hence its effectiveness. Since polysaccharide B-1459 is relatively expensive when compared to the price of the recovered crude oil, adsorption of the polysaccharide must be prevented or substantially eliminated in order for use of polysaccharide B-1459 to be economical.

SUMMARY OF THE INVENTION

The present invention relates to an oil-recovery waterflood process in which the sweep efficiency of an aqueous flooding liquid has been enhanced by the addition of an ionic polysaccharide which acts as an aqueous thickener.

In the present invention, a sacrificial inorganic agent is employed to treat a recovery zone of a subterranean reservoir which is to undergo waterflooding operations wherein the aqueous flooding liquid, e.g., water, is thickened with an ionic polysaccharide, e.g., polysaccharide B-1459. The sacrificial agent which preferentially adsorbs on the reservoir rock surfaces with respect to the polysaccharide B-1459 may be injected prior to the injection of the thickened water, may be incorporated directly into the thickened water, or, as is preferred, may be both injected prior to the thickened water and incorporated into same.

The sacrificial agent is injected in an amount sufficient to satisfy substantially all of the active adsorption sites within the recovery zone so that relatively few, if any, active adsorption sites remain on which the polysaccharide B-1459 can adsorb. The actual operation and the apparent advantages of the present invention will be better understood by referring to the following detailed description.

DESCRIPTION OF THE PREFERRED EMBODIMENT

In accordance with the present invention, there is provided a new and improved process for recovering oil from a subterranean reservoir penetrated by spaced injection and production systems which define a recovery zone. As will be understood by those skilled in the art, the term "recovery zone" as used herein means that portion of the reservoir through which oil is displaced from the injection system to the production system by an injected fluid. The injection and production systems may comprise one or more wells extending from the surface of the earth into the recovery zone and such wells may be located and spaced from one another in any desired pattern. For example, the so-called "line flood" pattern may be utilized, in which case the injection and production wells are located in rows extending generally parallel to one another. Other arrangements which may be used include those in which a central injection well is surrounded by a plurality of production wells. Such an arrangement may be a five-spot, seven-spot, nine-spot, or other similar pattern.

In the present invention, oil is to be recovered from a recovery zone by means of a waterflooding operation wherein the aqueous flooding liquid, e.g., water, has been thickened by the addition of an ionic polysaccharide selected from the group of heteropolysaccharides prepared by employing the bacteria of the genus *Xanthomonas*. Of these heteropolysaccharides, the polysaccharide B-1459 is preferred. Polysaccharide B-1459 contains d-glucose, d-mannose, and d-glucuronic acid groups in the ratio to 2.8:3.0:2.0. It also contains about 3 to about 3.5 percent by weight pyruvic acid and about 4.7 percent by weight of acetic acid. The acetic acid exists as the O-acetyl ester, whereas the pyruvic acid is attached through a ketal linkage. The polysaccharide B-1459 is produced by culturing bacterium *Xanthomonas campestris* NRRL B-1459 United States Department of Agriculture, on a well-aerated medium having a pH of about 7 containing commercial glucose, organic nitrogen sources, dipotassium hydrogen phosphate, and appropriate trace elements. The preferred fermentation temperature during the culturing is about 28°C. The fermentation reaction is complete in about 96 hours or less. Bacterial cells and suspended impurities are removed from the fermentation product by centrifugation after adjusting the pH to from 5 to 6. The polysaccharide B-1459 is precipitated from the centrifuged fermentation product by adding salt and a low molecular weight alcohol thereto.

The polysaccharide B-1459 is now a relatively standard product. Its molecular weight is estimated to be in the millions, judging from the fact that a 1 percent by weight aqueous solution of the polymer has a viscosity of 3,000 centipoises when measured at 25°C. on a Brookfield LVT viscometer at 30 r.p.m. A suitable polysaccharide B-1459 is commercially available under the trade name "Kelzan" from the Kelco Company, San Diego, California 92123.

In flooding with water thickened with polysaccharide B-1459, however, it has been observed that the thickened water loses a substantial amount of its high viscosity shortly after it is injected into the recovery zone, thereby adversely affecting the sweep efficiency of the waterflood. One cause for the viscosity decrease has been determined to be degradation by bacterial attack. This can be prevented by the use of bactericides and it is common practice to do so. However, tests now indicate that this decrease in viscosity is also due to the polysaccharide B-1459 leaving the thickened water and absorbing onto surfaces within the recovery zone. To combat this adsorption of polysaccharide B-1459 and the corresponding decrease in viscosity of the flood water, the present invention provides for treating the recovery zone with a sacrificial inorganic agent which will compete with the polysaccharide B-1459 for the active adsorption sites within the recovery zone.

The sacrificial inorganic agent employed in the present invention is such that it will successfully compete with polysaccharide B-1459 for the active adsorption sites within the recovery zone and at the same time be inexpensive enough to make its use in a waterflooding operation economically feasible. The simplest sacrificial inorganic additive comprises a water-soluble carbonate and/or a water-soluble polyphosphate. Suitable soluble carbonates include the alkali metal carbonates, preferably sodium carbonate. The inorganic polyphosphates are those polyphosphates which have high adsorption coefficients and adsorb strongly onto active sites of the subterranean formation. Typical are sodium tripolyphosphate, $Na_5P_3O_{10}$, and sodium hexametaphosphate, $(NaPO_3)_6$.

The sacrificial agent may be injected through the injection system into the recovery zone in an aqueous solution prior to the injection of the thickened water or it can be added to the thickened water itself. Preferably, both of the above are done, i.e., an aqueous solution of the sacrificial agent is injected prior to injecting thickened water and the sacrificial agent is also added to the thickened water. In any case, the sacrificial agent should be introduced into the reservoir in an amount sufficient to satisfy substantially all of the active adsorption sites within the recovery zone.

The total amount of the sacrificial agent needed to satisfy this requirement can be determined by relatively simple test procedures carried out with regard to samples of the particular reservoir rock and the sacrificial agent. For example, the "saturation-adsorption" value of the sacrificial agent with respect to the particular reservoir rock can be determined through adsorption tests wherein a sample of the reservoir rock is disaggregated and then contacted with various concentrations of aqueous solutions of the sacrificial agent to be used. This "saturation-adsorption" value, which is merely the maximum amount of solute which can be adsorbed from a given carrier liquid per unit volume or weight of adsorbent, can then be multiplied by the in situ density of the reservoir rock to determine the amount of sacrificial agent required per unit volume of reservoir. Next, this value need only be multiplied by the total volume of the recovery zone to arrive at the total amount of sacrifical agent required.

The concentration of the sacrificial agent in the aqueous solution should be sufficiently high to satisfy the "saturation-adsorption" value of the reservoir rock, but otherwise the concentration level employed is not critical. If a relatively high concentration of the sacrificial agent is used, then a relatively small treatment volume is required to satisfy the active adsorption sites. If the sacrificial agent is injected prior to injection of the thickened flood water, the use of a relatively concentrated solution of the agent is preferred, e.g., greater than 0.1 percent by weight. If such a pretreatment of the reservoir is not carried out, that is, if the sacrificial agent is not injected prior to injection of the thickened flood water but is injected with the thickened flood water, it is preferred that the leading edge of the thickened water slug also have a relatively high concentration of the sacrificial agent, e.g., greater than 0.1 percent by weight. Behind the leading edge, the concentration of sacrificial agent may be reduced to lower levels, e.g., 0.05 percent by weight. If, as preferred, the sacrificial agent is injected both prior to and along with the thickened flood water, it is desirable that the pretreatment aqueous solution have a relatively high concentration of sacrificial agent, e.g., greater than 0.1 percent by weight, while the concentration of sacrificial agent in the thickened flood water may be at a relatively low level, e.g., at about 0.05 percent by weight. The upper concentration limit of the sacrificial agent will, of course, be determined by the solubility of the agent and its compatibility with the ionic polysaccharide.

As stated above, it is preferred to inject the sacrificial agent prior to the thickened water and also to add it to the thickened water itself. In pretreating the recovery zone, the sacrificial agent will cover substantially all of the adsorption sites in which it comes into contact, thereby leaving few, if any, sites on which the relatively expensive ionic polysaccharide can adsorb. By including additional sacrificial agent in the thickened water itself, the sacrificial agent will compete with the ionic polysaccharide for any adsorption sites contacted by the thickened water which were not contacted in the pretreatment of the recovery zone and thereby keep adsorption of the polysaccharide at a minimum.

To illustrate better the present invention, the following results of a laboratory experiment are cited to show the positive effects that a sacrificial agent, as described above, has on the adsorption of an ionic polysaccharide from solution onto a typical rock surface. One gram of kaolinite was submerged into a 1 percent sodium chloride solution which had been thickened using polysaccharide B-1459. After 48 hours equilibration time, 4.3 milligrams of polysaccharide B-1459 had been adsorbed from the solution onto the kaolinite as determined by the decreased polysaccharide concentration in the aqueous phase. The same procedure was repeated but this time 0.1 percent by weight of sodium tripolyphosphate and 0.05 percent by weight of sodium carbonate was added to the 1 percent sodium chloride solution of thickened water. After the same period of time, adsorption of polysaccharide B-1459 was determined and found to be reduced to 0.4 milligrams.

It can be seen from the above that the use of an inorganic sacrificial agent with flood waters containing ionic polysaccharide thickeners provides a process where adsorption of the ionic polysaccharide from the flood water is substantially reduced. This process allows the flood water to maintain its relatively high viscosity throughout the flooding operation, thereby substantially increasing the sweep efficiency and hence the overall efficiency of the waterflood.

I Claim:

1. In a flooding process for recovering oil from a subterranean reservoir having at least one injection well and at least one spaced production well which define a recovery zone in said reservoir and where the aqueous liquid used in the flooding operation has undergone an increase in viscosity due to the addition of an ionic polysaccharide, the process comprising:

injecting into the recovery zone through said injection well a sacrificial agent which preferentially adsorbs on the surfaces of said recovery zone with respect to ionic polysaccharide to cover potential, active adsorption sites within said recovery zone, said sacrificial agent being injected in an amount sufficient to satisfy substantially all of said active adsorption sites in said recovery zone;

injecting aqueous flooding liquid containing ionic polysaccharide through said injection well into said recovery zone; and recovering oil from said production well.

2. The process of claim 1 wherein said ionic polysaccharide is polysaccharide B-1459, the heteropolysaccharide produced by bacterium *Xanthomonas campestris* NRRL B-1459, United States Department of Agriculture, from commercial glucose in a fermenting operation.

3. The process of claim 1 wherein said sacrificial agent is a water-soluble carbonate.

4. The process of claim 3 wherein said water-soluble carbonate is sodium carbonate.

5. The process of claim 1 wherein said sacrificial agent is an inorganic polyphosphate.

6. The process of claim 5 wherein said inorganic polyphosphate is sodium tripolyphosphate or sodium hexametaphosphate.

7. The process of claim 1 wherein said sacrificial agent is both a soluble carbonate and an inorganic polyphosphate.

8. The process of claim 7 wherein said soluble carbonate is sodium carbonate and said inorganic polyphosphate is sodium tripolyphosphate or sodium hexametaphosphate.

9. The process of claim 1 wherein said sacrificial agent is injected into said recovery zone contained in an aqueous liquid injected prior to the injection of said aqueous flooding liquid.

10. The process of claim 1 wherein said sacrificial agent is injected into said recovery zone contained in said aqueous flooding liquid.

11. The process of claim 1 wherein said sacrificial agent is injected in aqueous solution prior to the injection of said aqueous flooding liquid and is also contained in said aqueous flooding liquid.

Mobil Case No. 7185

PO-1050
(5/69)

UNITED STATES PATENT OFFICE
CERTIFICATE OF CORRECTION

Patent No. __3,532,166__ Dated __October 6, 1970__

Inventor(s) __Sherrod A. Williams__

It is certified that error appears in the above-identified patent and that said Letters Patent are hereby corrected as shown below:

In the Abstract, line 7, "ab-" should be --ad- --.

Column 1, line 44, "absorb" should be --adsorb--.

Column 2, line 71, "ab-" should be --ad- --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents